Oct. 29, 1935.   R. W. REITHERMAN ET AL   2,018,874
INDICATOR LIGHT
Filed Jan. 21, 1933
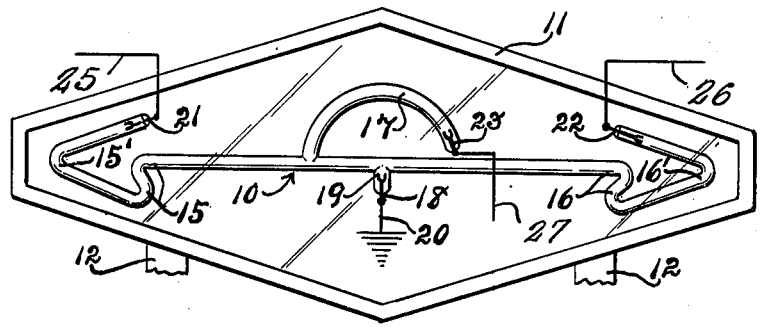
Inventors
Ralph W. Reitherman
and
Arthur H. Cokell
by J. Daniel Stuwe
Attorney.

Patented Oct. 29, 1935

2,018,874

UNITED STATES PATENT OFFICE 2,018,874

INDICATOR LIGHT

Ralph W. Reitherman, Elmwood Park, and Arthur H. Cokell, Chicago, Ill.; said Reitherman assignor to said Cokell Application January 21, 1933, Serial No. 652,824

2 Claims. (Cl. 177—327)

This invention relates to an indicator light and circuit.

One of the objects of this invention is to provide a particularly bright and luminous indicator light which will in an impressive manner indicate an intended turn or a stop of a motor vehicle, and will thereby aid materially in reducing accidents.

Another object is to provide a brilliant automobile light including turn indicator means and a stop light equipped with novel and improved circuit means for efficiently actuating the same.

These and various other objects and advantages will become apparent from the following description, taken in connection with the accompanying drawing, in which the invention is shown in its preferred form, it being understood that various other arrangements and forms of construction may be resorted to for carrying out the objects and purposes of this invention.

In the drawing:

The figure is an elevational view of our improved indicator light.

This invention as illustrated in the drawing comprises a brilliantly illuminated signalling light including directional turn indicators and a stop light, adapted for use on an automobile.

The light is provided in the form of a tubular member 10 preferably protected within a housing 11 which is mounted on suitable bracket means 12 in a suitable position at the rear of the automobile. This tubular member contains an inert gas, for example, neon, argon, helium, and the like.

The tubular member 10 is arranged in several sections, as indicated in the drawing, including a section 15 bent in the form of an arrow 15' at its left-hand end to indicate a left-hand turn; and a section 16 bent in the form of an arrow 16' at its right-hand end, to indicate a right-hand turn; also a curved and substantially semicircular section 17 which is branched off from the intermediate part of main portion 10, substantially as indicated in the drawing. This tubular member is arranged so that all three of the portions or sections have their interior in constant communication and contain the inert gas therein.

The tubular member 10 is provided with a terminal member 18, mounted in and protruding from a tubular projection 19 provided centrally of said member, and this terminal is grounded by means of a suitable wire 20, as indicated in the drawing. Suitable electrodes 21, 22 and 23 are provided in the ends of the sections 15, 16 and 17 respectively, and protrude therefrom, adapted for attachment thereto of the circuit wires 25, 26 and 27, respectively.

With this arrangement and construction of signal light, when a stop signal is to be given that portion of the tube from terminal 18 to terminal 23 is illuminated, thereby functioning as a stop light and backing light; when a signal for a left-hand turn is to be given that portion of the tube from terminal 18 to terminal 21 is illuminated, thereby functioning as a left-hand turn indicator; and when a signal for a right-hand turn is to be given that portion of the tube from terminal 18 to terminal 22 is illuminated, thereby functioning as a right-hand turn indicator, in each case providing a very bright and effective indicator light.

We claim as our invention:

1. An automobile signalling device consisting of a substantially straight tubular body member provided with a protective housing having bracket means for mounting the device on an automobile, said tubular member including bent end portions providing arrow-shaped end sections to serve as turn indicators, also including a tubular branch section having one end integral with said body member and the other end free and extending curved over the intermediate part thereof to serve as a stop light, an electrode in the end of each section adapted for attachment to a circuit wire, and a common terminal element protruding from the intermediate part of said member adapted to be grounded through said housing on the automobile, thereby providing several different indicator means each extending from its electrode to said common terminal and being separately illuminable.

2. An automobile signalling device comprising a tubular member provided with a protective housing adapted for mounting the device on an automobile, said member consisting of a body part in the form of a straight tube which has integral arrow-shaped end portions serving as turn indicators and also has an intermediate tubular branch portion integral at one end with the straight tube and in open communication with the interior of the latter to serve as a stop light, an electrode in the end of each portion adapted for attachment to a circuit wire, and a common terminal element protruding from the middle of said straight tube adapted to be grounded through said housing on the automobile, thereby providing several different indicator means each extending from its electrode to said common terminal and being separately illuminable.

RALPH W. REITHERMAN.
ARTHUR H. COKELL.